United States Patent [19]
Bartley et al.

[11] Patent Number: 4,758,944
[45] Date of Patent: Jul. 19, 1988

[54] METHOD FOR MANAGING VIRTUAL MEMORY TO SEPARATE ACTIVE AND STABLE MEMORY BLOCKS

[75] Inventors: David H. Bartley; Timothy J. McEntee, both of Dallas; Donald W. Oxley, Carrollton, all of Tex.

[73] Assignee: Texas Instruments Incorporated, Dallas, Tex.

[21] Appl. No.: 644,072

[22] Filed: Aug. 24, 1984

[51] Int. Cl.$^4$ ............................................. G06F 12/12
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,882,470 | 5/1975 | Hunter | 364/900 |
| 4,121,286 | 10/1978 | Venton et al. | 364/200 |
| 4,123,795 | 10/1978 | Deem, Jr. et al. | 364/200 |
| 4,189,773 | 2/1980 | O'Meara | 364/200 |
| 4,446,516 | 5/1984 | Nishimura | 364/200 |

Primary Examiner—Gary V. Harkcom
Assistant Examiner—C. H. Lynt
Attorney, Agent, or Firm—Kenneth C. Hill; Thomas W. Demond; Melvin Sharp

[57] ABSTRACT

A pointer, N, indicates an address in a virtual memory space of a demand paged memory including a plurality of virtual address pages and a fixed number of physical memory pages into which blocks of information can be written. A back-up memory store is provided for containing paged-out memory pages. The pointer, N, is advanced along the virtual address pages to indicate the next available virtual address page for allocation, and newly allocated blocks are located on the virtual address page pointed to by said pointer N. Should the necessary space for a block allocation not exist on the page pointed to by said pointer, N, a page which is most recently used and least sparsely utilized is identified from the physical pages onto which blocks have been previously written the block is allocated on that page. If no space remains on the virtual address pages in physical memory for block allocation, then, a least recently used and most sparsely allocated page is identified and paged-out to the back-up store.

4 Claims, 4 Drawing Sheets

METHOD FOR MANAGING VIRTUAL MEMORY TO SEPARATE ACTIVE AND STABLE MEMORY BLOCKS

BACKGROUND OF THE INVENTION

1. Field of the Invention

This invention relates to improvements in memory systems, and more particularly, to improvements in methods for managing memory systems, and still more particularly to an improved method for segregating active and stable blocks for improved memory response time.

2. Background Information

The development of storage management systems has a long history with many related branches of research. Over the years, a great deal of attention has been given to the allocation and deallocation of memory structures. Many memory structures of interest are shown by Deitel, H. M., *An Introduction to Operating Systems*, Addison-Wesley, Massachusetts, Chapter 7, 1982. Other major issues are discussed by knuth, D., *The Art of Computer Programming*, Vol. 1: Fundamental Algorithms, Addison-Wesley, Reading, Mass., 1968. The invention herein described is concerned primarily with computer systems having heap managed memories, and is used together with or independently from a garbage collection scheme. A "heap managed" memory is one in which the memory is allocated and freed (either explicitly or implicitly) without regard to the temporal order or the size of the memory unit under consideration. A garbage collected memory is one in which usable memory is automatically reclaimed, and the memory may be reorganized from time to time to efficiently utilize the space of the memory, as needed. A survey of garbage collection techniques and related background materials is presented by Cohen, J., "Garbage Collection of Linked Data Structures", *Computing Surveys*, Vol. 13, No. 3, September, 1981, pp. 341-367. P. Bishop discusses garbage collection in very large address spaces in "Garbage Collection in a Very Large Address Space", Massachusetts Institute of Technology, Working Paper 111, September 1975.

Additionally, the overall size of a virtual memory space is often of concern, since garbage collection costs increase with the size of the space being collected, not with the amount of garbage being reclaimed.

In the operation of a typical memory system and associated central processing unit (CPU), the CPU requests the allocation of memory space as needed. Often, the allocation of the memory is done in a virtual address space. As the virtual address space becomes fully allocated, eventually requests for additional space must be denied, until reusable space in the previously allocated virtual address space has been identified and reclaimed.

As used herein, the term "physical memory" means the actual physical memory, including the main memory, usually RAM semiconductor devices, and the backing store, usually a paging disk. The term "virtual address space" is used to mean a uniform linear, and homogenous apparent memory space.

Generally in memory systems of the type to which the invention pertains, portions of memory are allocated in "blocks" of size specified by the CPU. Each block has a header in which various pieces of information are contained pertaining to the block, including, for example, the identification of the block its size, and other things which may be of interest. Also contained in the block header is a field containing a reference count. The reference count of a block indicates the number of references to the block from any other block, or itself. One form of reference count is shown by Deutsch et al., "An Efficient, Incremental, Automatic Garbage Collector", *CACM*, Vol. 19, No. 9, September, 1976, pp. 522-526. In the type of memory to which the method of this invention pertains, when a block is initially allocated, it has a reference count of zero. Any time a new reference is established, the reference count is incremented. When a reference within a block is destroyed, the reference count of the target block is decremented. Except when a block is originally created, when the reference count of a block is decremented to zero, the block is considered to be garbage, and the space it occupies can be reclaimed.

In the memory management systems in the past, as blocks were allocated and deallocated, often pages containing very few blocks were paged out to disk to make room for further block allocation. As the need arose for access to the paged out blocks, usually, some additional page in the main memory would need to be paged out to make room for the page to be brought in from the disk. Then, the sparsely populated page is brought into the main memory from the disk, and the block needed used, after which it is almost immediately written back out to the disk. It can be seen that this produces a great deal of "thrashing", involving rapid, frequent disk fetch and write operations, and is undesirable since it greatly slows down memory operations.

What is needed is a method for managing a memory in which blocks are efficiently stored in a manner by which those which are infrequently needed are collected and compactly stored and paged out into disk, and blocks which are frequently used are collected and maintained in main memory for efficient access.

One method which has been proposed is taught in copending U.S. patent application entitled "METHOD FOR MANAGING VIRTUAL MEMORY TO SEPARATE ACTIVE AND STABLE MEMORY BLOCKS" by Bartley et al., Ser. No. 634,334, filed July 24, 1984, now U.S. Pat. No. 4,660,130, assigned to the assignee hereof, and incorporated herein by reference. Said patent discloses a method for compacting blocks of memory in a demand-paged, virtual address space which includes a plurality of virtual address pages. The method includes the steps of identifying active and stable blocks to be compacted by defining a pointer, N, to indicate an address of the virtual memory space and advancing the pointer, N, to continually indicate the address of the beginning of available virtual memory space. As new blocks are allocated, they are located in the virtual address space beginning at the location of the advancing pointer. Additionally, as blocks are referenced by the user, they are moved to the current location of the advancing pointer, so that, therefore, active blocks are collected together on active pages.

In one aspect of the method of the invention of said Bartley et al. patent, the extent of utilization of each page is determined, and blocks to which reference is made by the user are moved only if the extent of utilization of the page on which the referenced blocks are located falls below a predetermined level. Furthermore, a disk memory is provided, and periodically, the pages containing collected stable blocks are "paged-out" to it.

In accordance with still another aspect of said Bartley et al. patent, an associative look-up table is provided into which is written the identification and location of blocks which are moved to a special page which will eventually be paged-out. Also maintained in each table entry is a reference count of each block identified therein. The associative look-up table is periodically scanned to update references to the blocks identified in it.

BRIEF DESCRIPTION OF THE INVENTION

In light of the above, it is an object of the invention to provide a method for memory management of a demand paged virtual memory which improved the overall throughput of data in the memory by reducing the time waiting for disk, and time in which the CPU is delayed during frequent garbage collections.

It is another object of the invention to provide a method of the type described in which allocation response time is improved.

It is another object of the invention to provide a method of the type described in which efficient use of the backing store is enabled by ensuring that sparsely allocated pages are not written out to disk.

It is still another object of the invention to postpone the need to page out a page to the backing store by allocating and copying forward blocks onto pages having a low percent of utilization.

These and other objects, features and advantages will become apparent to those skilled in the art from the following detailed description, when read in conjunction with the accompanying drawings and appended claims.

In its broad aspect, the invention presents a method for compacting blocks of memory in a demand paged virtual address space which includes a fixed plurality of virtual address pages and a fixed number of physical memory pages onto which blocks of information are written, and having a back-up memory store of containing paged-out pages of memory. The method comprises the steps of defining a pointer, N, to indicate a page of said virtual memory space and advancing the point to continually indicate an available virtual page for allocation. As new blocks are allocated, they are located at the next available virtual address on the page pointed to by the advancing pointer. Additionally, as blocks are referenced by the user, they are moved to the next available virtual address on said page at N, so that, therefore, active blocks (defined below) are collected together on active pages. Should there not be adequate space on said page at N for a block allocation request or for moving an active block to said page, a location is found on another page in physical memory. Should there not be adequate space for said block on any page in physical memory, then, a virtual page is removed from physical memory to the backing store and the freed physical page is then used for advancing to the next available virtual address page.

DESCRIPTION OF THE DRAWING

The invention is illustrated in the accompanying drawing, wherein.

In the various figures of the drawing, like reference numerals are used to denote like or similar items or parts.

DETAILED DESCRIPTION OF THE PREFERRED EMBODIMENTS

On-the-fly (OTF) compaction addresses many needs for effective memory management. These include the need to improve overall throughput by reducing any time wasted waiting for disk, and time in which the CPU is delayed during frequent garbage collections. Also of concern are the need to improve allocation response time and the need to more effectively use the backing store by not writing out sparsely allocated pages. Finally, the need to minimize both the dynamic and static working sets (described below) is of interest.

Figure 1:
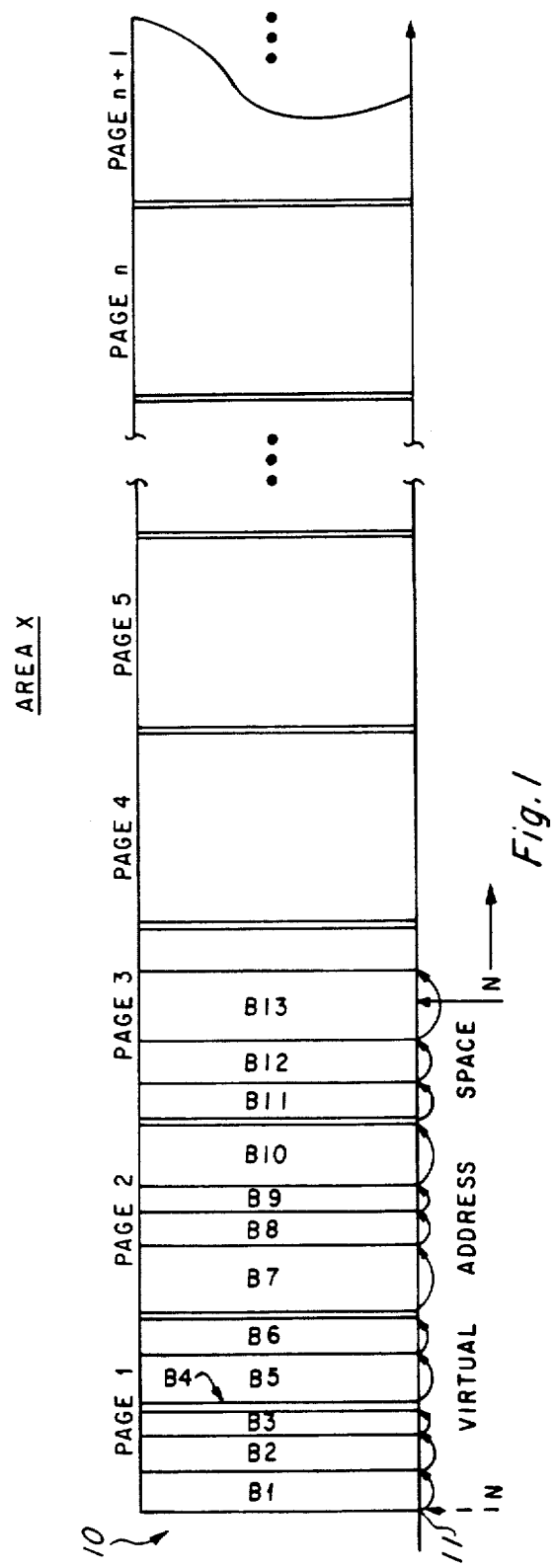
FIG. 1 is a diagrammatic illustration showing the configuration of the virtual address space of an Area X as blocks are being initially allocated thereto, in accordance with the invention.

The invention is illustrated diagrammatically in FIG. 1, representing an area X, (in the sense of Bishop, supra) within a virtual address space of a memory. In order to simplify the description of the concepts, OTF compaction is described with respect to a single memory area X. It should be emphasized that more than one area can be active at any given time, but operations on only one area are described herein for clarity. Ordinarily, the physical memory, backing store, and so on, contain several such areas which comprise the available resources.

The virtual address space 10 is represented by a contiguous, homogeneous set of addresses beginning from an initial point 11 and continuing for the length of the area X. In general, in observing a virtual address space, three different types of blocks can be found. These are active blocks, stable blocks, and garbage blocks. An active block is one which is actively referenced by the CPU. It can be "volatile" in the sense that it may be a short-lived; that is, the CPU may allocate it, use it for a short period of time, and discard it. A stable block is one which is accessible to the CPU, but which has not been needed or accessed for a relatively long period of time. A garbage block is one which is no longer accessible to the CPU, but whose reference count is not zero. A reference count of a block represents the number of references to the block from any other block or itself. When a block is initially allocated, it has a reference count of one, and whenever a new reference is established, the reference count is incremented. Any time a reference within a block is destroyed, the reference count of the target block is decremented. Reference counts are particularly useful in garbage collection procedures, and an example can be seen in copending United States patent application, Ser. No. 636,187, filed July 31, 1984, entitled "Computer Memory Systems with Parallel Garbage Collection Independent from an Associated User Processor", by Oxley, et al, assigned to the assignee hereof and incorporated herein by reference as background.

One primary objective of the OTF compactor is to keep the most active blocks in physical memory. Thus, as will become apparent, stable blocks are eventually placed in the backing store, unless space is available in physical memory.

Since it may be desirable to use demand paging for the virtual memory, it would be advantageous for each page to hold blocks which are of identical type: active, stable, or garbage. Thus, the page can be selectively located in memory (all active), paged out (all stable), or reused (all garbage).

It would be ideal if, at any given point in time, the set of virtual address pages containing active blocks, referred to herein as the "dynamic working set" were smaller than the physical memory of the system. Further, it would be ideal if the set of virtual address pages containing both stable and active blocks, referred to herein as the "static working set", were as small as possible and it is important that the set be less than the backing store of the system.

Blocks are "copied or moved forward" on certain references in order to consolidate active blocks into "active" pages. Thus, for instance, when a block is accessed, for data access, for example, the block is moved forward to an active page. "Old" pages tend therefore to contain only stable and garbage blocks, and can be selectively paged out. The result is that stable blocks are consolidated and some of the garbage blocks are identified and reclaimed. It should be noted that not all garbage blocks will be identified during the paging out process. Garbage collection (GC) may be eventually required to expunge the remaining garbage blocks.

Under the normal operation of memory management, two types of events frequently occur. These are the allocation of a new block for future use by the CPU, and the reclamation of a block no longer of use to the CPU, as indicated by the fact it no longer has any references to it. Ideally, the frequency of these two events is equal. For every block reclaimed from the static working set there is a new block added to it. Thus, the size of the static working set remains relatively constant.

In the absence of garbage collection, reference counts are the only means of reclaiming discarded blocks. When a block is reclaimed because its reference count has reached zero, a portion of the virtual address page in which the block resided is freed, and, therefore, can be considered a re-usable page fragment. After several blocks are reclaimed, several page fragments may exist on several pages. In accordance with the present invention, a mechanism to keep track of these page fragments is provided so that, the fragments can be used as the locations to allocate new blocks and to "copy forward" blocks which have been determined to be active blocks (as described below.) This avoids the problem wherein the locality of references of accessible blocks becomes quite scattered. Blocks highly referenced and highly associated to one another could be distributed among far more virtual address pages than there are pages for physical memory. This would result in sever thrashing, that is, frequent paging in and paging out or disk accessing.

The OTF scheme of the invention manages the allocation and removable of blocks. New blocks are allocated at the virtual address page pointed to by an advancing pointer, referred to herein as "N", as shown in the Figures. When a block is allocated to the page, it is placed at the next available address of the unused portion of the page. Thus, as shown in FIG. 1, blocks denoted B1–B13 are sequentially located in the virtual address space 10, each beginning from the next available address in the page pointed to by pointer N. Further, in accordance with the invention, there is no attempt to reuse portions of the page at N which are freed up when blocks are removed from the page.

Pointer N is "advancing" in the sense that, each time the page pointed to by N becomes full, N is updated to point to the next higher or larger virtual address page. When the highest virtual address page of the area becomes full, garbage collection is invoked.

Figure 2:
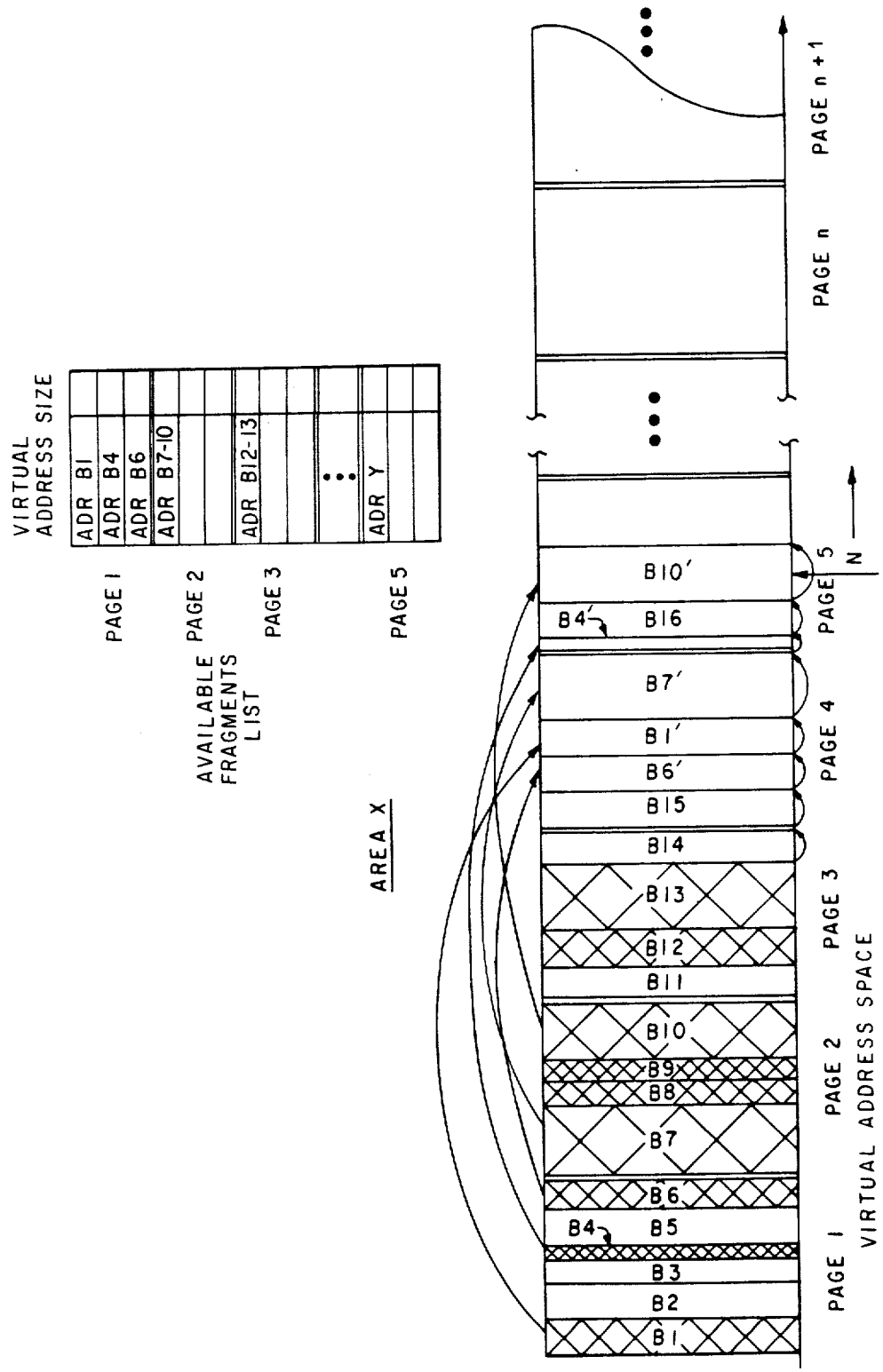
FIG. 2 is a diagrammatic illustration showing the virtual address space of an Area X of FIG. 1 as blocks are deallocated and referenced blocks are copied forward, and illustrating the operation of an available fragments list for pages which are neither entirely full nor empty, all in accordance with the invention.

Allocation of blocks is only one of the frequent events which occurs in response to the CPU request. Blocks are also reclaimed from the pages comprising the dynamic and static working sets as their reference counts become zero. Thus, as shown in FIG. 2, during the time blocks B1–B13 have been allocated, certain blocks have also been deallocated. In the example shown, for instance, blocks B8, B9, B12, and B13 have been deallocated or reclaimed. Each time a block is reclaimed from a virtual address page, that information is indicated on an available fragments list, as described below. Further, the utilization of that page decreases. To what extent a page is utilized is an important parameter which will be accurately maintained as part of each control structure of the page. When an empty virtual address page is first brought into physical memory, the percent of utilization of the page is, obviously, zero. Each time a block is allocated to the page, the percent of utilization of the page is increased appropriately. By the same token, each time a block is reclaimed from a page, the percent of utilization of the page is decreased.

A list of available fragments 25 is maintained (see FIG. 2). There are several reasons why it would be desirable to maintain a list of fragments which are freed during the reclamation of blocks and then make use of these freed fragments for block allocation. Block allocation may be made from fragments in pages other than the page pointed to by N. Also, garbage collection algorithms may take advantage of knowing the locations of freed fragments.

There are several possibilities on how such information could be maintained. For example, an "available fragment list" (not shown) for each area can be kept. Each node of the linked list contains the virtual address and size of a fragment which is available (free). Each time fragments are allocated, they are correspondingly removed from the list. Conversely, when fragments are reclaimed, the appropriate information is entered on the list.

Another possible way of maintaining knowledge of freed fragments is to maintain an available fragment list, as shown in FIG. 2, for each page which is either not entirely free or entirely full. One restriction, other than the fact the fragments must be contiguous, which is placed on block allocation (except for multi-use blocks) is that the fragments which make up the block be located in the same page. The page by page available fragment list contains the appropriate information to meet that restriction.

When fragments become free, after a block is reclaimed, this information must be reflected in the list 25. Fragments whose virtual addresses lie between two existing nodes are placed in a node between the existing nodes. In order to both keep the size of the list as small as possible, and to create fragments as large as possible, nodes on the list are combined whenever possible.

Another similar way of maintaining knowledge of freed fragments is to provide a bit map (not shown) as part of the control structure information for each page. Available fragments would be represented by consecutive zeros in the bit map. When fragments are allocated, their corresponding representatives in the bit map would be changed to one.

It will be appreciated that the number of physical pages is limited. Also, as pointer N advances, new physical pages are needed to allocate new blocks. Common schemes will page out an arbitrary page without regard to what exists on it. However, paging out pages which are not fully utilized, that is, pages whose percent of utilization may have decreased considerably, does not lead to efficient use of disk space. Moreover, it would be unfortunate to move active blocks to disk, since active blocks are better placed in virtual address pages which remain in physical memory.

As mentioned, in order to make efficient use of disk space, and to keep active blocks in physical memory, the method of the invention relocates the active blocks residing in sparsely utilized pages which have been or soon will be paged out to virtual pages which are in physical memory. The page at pointer N, where new blocks are allocated, is in physical memory and is a part of the dynamic working set. Therefore, it is an ideal place in which to relocate any active blocks which meet certain criteria.

The first criterion for the decision to relocate or copy forward an active block is that the block be referenced by the CPU, (Referencing a block is the only way to distinguish an active block from a stable block.) Secondly, the active block is not already located in the page at pointer N. (This second criterion implies that a block in the page at pointer N is not copied forward, since nothing would be gained.) A third criterion, which is related to using the backing store efficiently, is that the active block be located on a page whose percent of utilization has fallen below a certain threshold. A page which is being fully utilized should be left alone, since even if the page is in physical memory and must be paged out so that another page may be brought in, the fact that it is not sparse would make efficient use of disk space. Unfortunately, this would result in removing an active block (there may even be other active blocks in the same page) from the dynamic working set.

A fourth criterion could, therefore, prove useful. If the active block is located in a page which is sufficiently "old", as determined by a least recently used (LRU) implementation with minimal overhead, the block is copied forward regardless of the percent of utilization of the page. This would, in effect, keep the active block in the dynamic working set, and "set off" the reduction of the percent of utilization of the page, as well.

Relocating an active block is illustrated in FIG. 2, in which block B1 is accessed. Block B1 is not located in the page pointed to by N, but is located in a page which has a low utilization. Therefore, it will be copied forward to virtual address page 4 (as N advances). The old location of block B1 is appropriately updated to point to the copied block. Other blocks (not shown) referencing block B1 will still point to the old copy of block B1 (in virtual address page 1), so it will be necessary to leave a forward pointer at the old location of block B1. In similar fashion, as shown in FIG. 1, blocks B4, B6, B7, and B10 are copied forward as they are referenced to the location as pointer N advances. As can be seen, as the blocks are copied forward, except for the forwarding pointer remaining, their addresses are listed in the available fragments list 25.

If a block meets the above criteria and is to be copied forward, the reference count of the block is first checked. A reference count of one indicates that there are not references to the block other than the block cell which the CPU has used to perhaps a binding register (see copending patent application Ser. No. 636,187, filed July 31, 1984, referenced above). Therefore, after copying the block and updating the object (cell or binding register) which referenced it so that it points to the new location of the block, the original copy of the referenced block can be reclaimed. The percent of utilization of the page which contained the original copy of the block is then decremented.

If the reference count of the block copied forward is greater than one, it is also necessary to leave a forward reference at the location of the original copy of the block so that the other objects which reference the block can find the new location of the block. When the forward reference is first placed in the original location of the block, its reference count takes on the reference count of the original block minus one, since all other references to the block only know of the old location of the block, and are, therefore, actually referencing the forward reference. The copied block, in the new location, is given a reference count of two, one for the object which referenced the block to cause the copy forward, and one for the forward reference to the block. Later, when an object encounters a forward reference, the object is updated to point to the new location of the block, the forward's reference count is decremented by one to account for the loss of the object's reference, and the reference count of the block at the new location is incremented by one to account for the pointer from the object. If the reference count of a forward reference reaches zero, it can be reclaimed after the reference count of the block to which it points is decremented by one.

It is desirable to avoid paging out a page in physical memory to the backing store unless it is absolutely necessary due to lack of available physical memory. Therefore, in accordance with the invention, when a block allocation request is made or an active block must be copied forward, and the page at N cannot accommodate the addition of the block, the block is copied forward or allocated to another page in physical memory, if possible. The selection of which page is a likely candidate for the block can be made by selecting a page in accordance with a most recently used (MRU) algorithm in combination with selecting a page with the lowest percentage of utilization. The MRU algorithm would indicate a page which is fairly likely to be an active page, while a page with low utilization would be most likely able to accommodate one or more potentially active blocks. The available fragment list for the page would then indicate where the block could be located on the page, making use of first-fit or best-fit algorithm. All of said algorithms are well known in the art, and are not described in detail herein.

Figure 3:
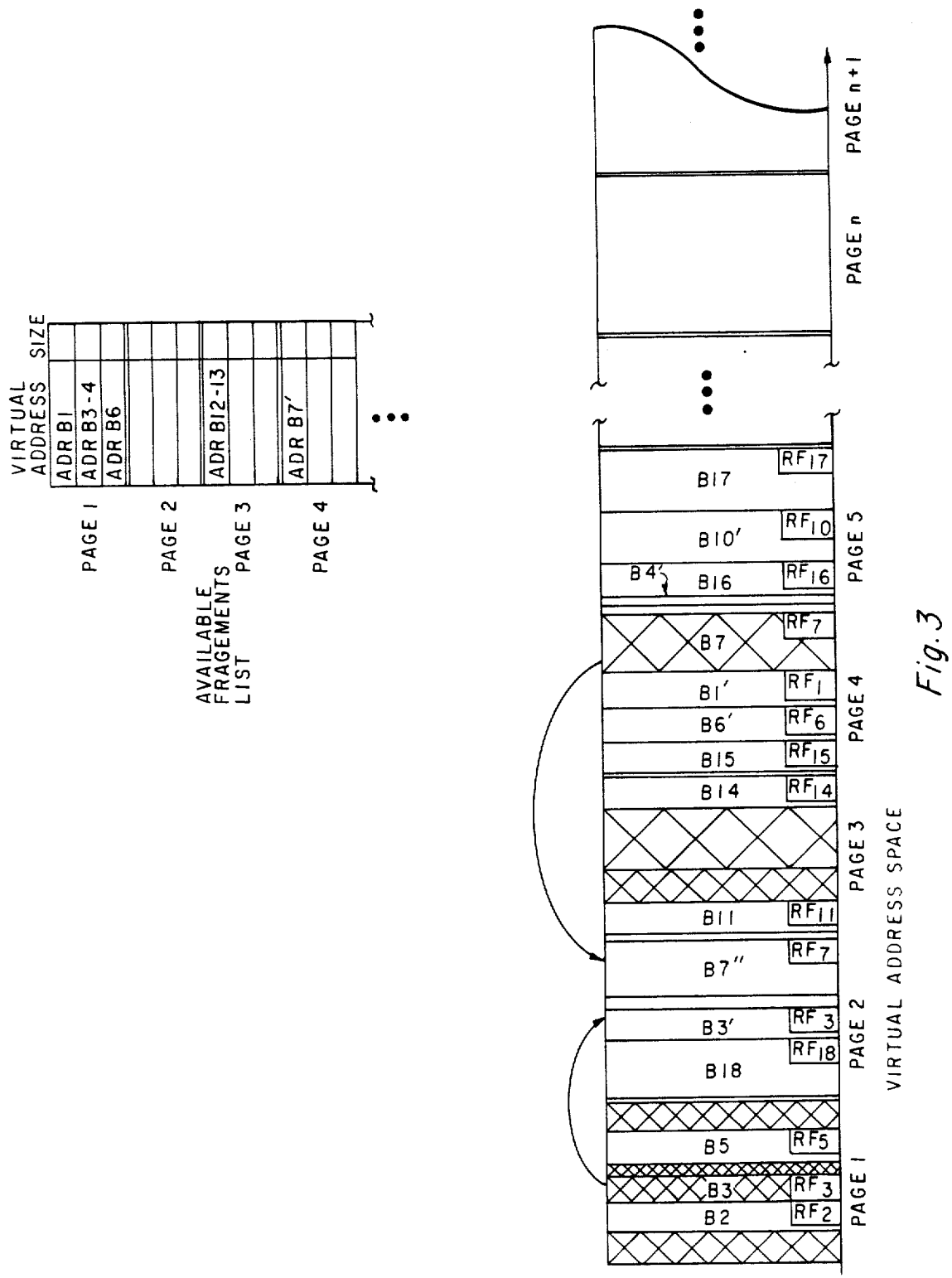
FIG. 3 is a diagrammatic illustration showing the identification of an active, sparsely allocated page, and allocating and copying forward blocks onto it, in accordance with the invention.

The allocation and copying forward of blocks to an alternate (not at pointer N) page is shown in FIG. 3. In the example, it is assumed that page 2 has been selected as the alternate page. Thus, blocks are copied forward to it when they are referenced by the CPU. As shown, blocks B3 and B7 are copied forward. Also, newly allocated block B18 is allocated onto page 2. In the copy forward and allocation processes, reference is made to the available fragment list 25 for location of the blocks on page 2.

Figure 4:
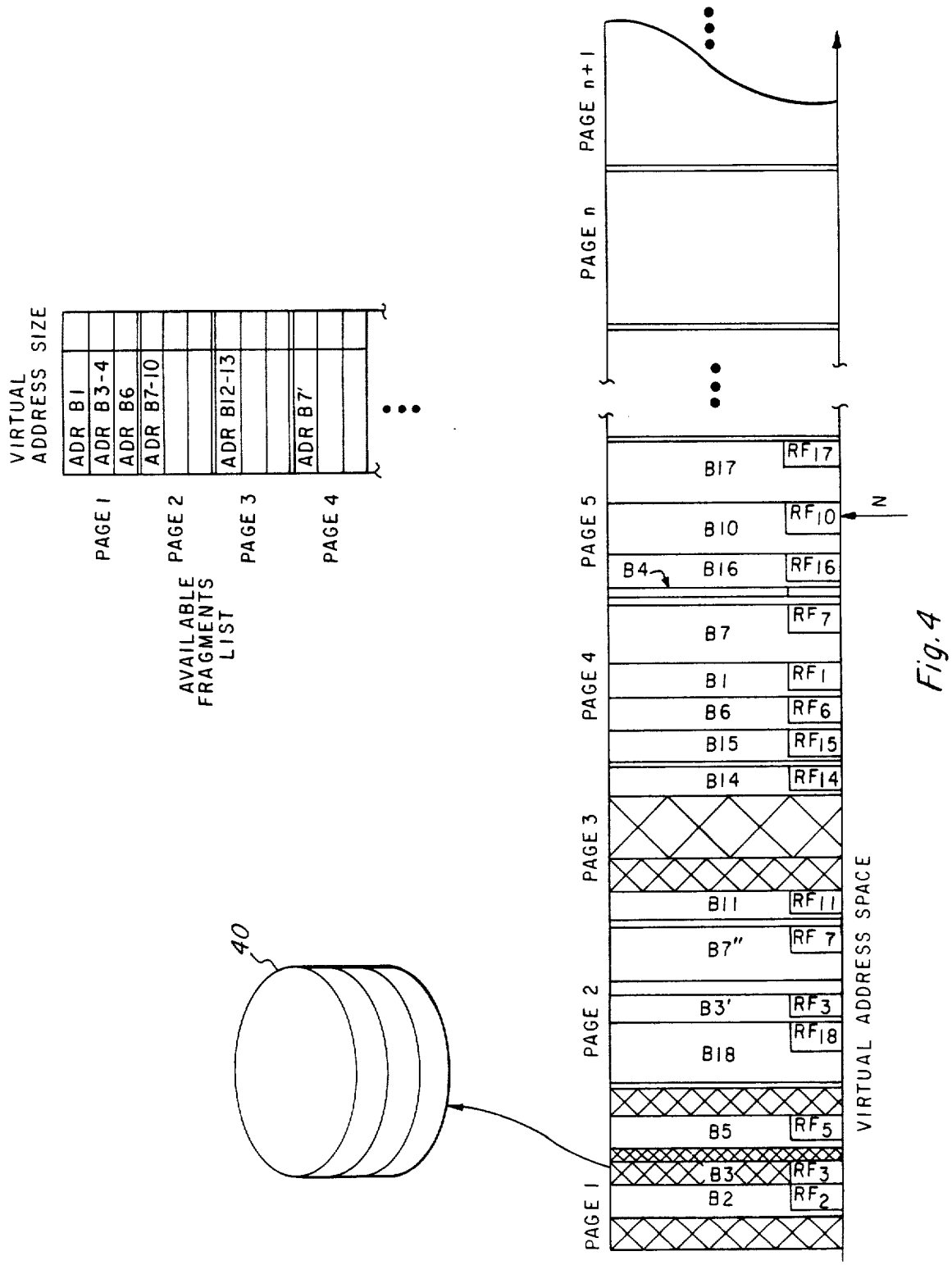
FIG. 4 is a diagrammatic illustration showing the virtual address space of an Area X of FIGS. 1 and 2 showing the identification and paging-out of a stable, non-sparsely allocated page to disk.

In accordance with the invention, when a block must be allocated which is larger than the available space on the page at pointer N, and there are no available fragments in the other pages in physical memory large enough to accommodate the new block, a page-out candidate is identified from the set of pages onto which blocks have been previously allocated. As shown, for instance, in FIG. 4, page 1 has been identified as a page-out candidate. The selection of the page-out candidate page can be accomplished by any desired selection technique; most preferably, by selecting a page in accordance with a least recently used (LRU) algorithm in combination with selecting a page with the highest percentage of utilization. This combination for selection indicates a highly utilized, stable page. The freed physical page is then available for allocation and copying forward blocks at the advanced pointer N.

It is desirable to locate and remove garbage blocks whenever possible. Unfortunately, there is limited opportunity to discover such blocks. If, however, two or more blocks form a circular list, and all blocks of the list are contained in a single page, and all blocks of the list have a reference count of one, such blocks are garbage blocks and may be detached during a sweep of the page about to be paged-out. A page sweep could also locate a block whose only references orginate in the block itself. As a consequence, enough garbage blocks may be reclaimed to produce the necessary available fragments, thus forestalling the need to page out a page to the backing store.

In this proposed scheme of allocation, it is highly likely that, since pages other than the one pointed to by N are used quite often, pointer N will advance through the virtual address space much more slowly. As a consequence, garbage collection may be postponed for a considerably longer period of time than in schemes heretofore advanced.

Although the invention has been described and illustrated with a certain degree of particularity, it is understood that the steps and procedures set forth are by way of example only and that numerous changes in the combination and arrangement thereof may be resorted to by those skilled in the art without departing from the spirit and scope of the invention as hereinafter claimed.

What is claimed is:

1. An improved method for compacting blocks of memory in a demand paged virtual address space including a fixed number of virtual address pages in a physical memory into which blocks of information are written, comprising:
   determining a ratio of allocated space to total space of virtual address pages onto which blocks have previously been written;
   providing a table for containing addresses of memory fragments which are available for allocation within such virtual address pages;
   storing in said table at least the beginning address and size of said available memory fragments into which blocks of information can be written;
   locating blocks of information onto a virtual address page in physical memory containing a memory fragment indicated by said table;
   when none of said available memory fragments are large enough to accommodate some block of information to be located onto a virtual address page, paging out to a mass storage device pages which are least recently used and which have a ratio of allocated space to total space which is higher than a predetermined level.

2. The method of claim 1 wherein said step of providing a table of available fragments comprises providing a linked list for each page of available fragments on said page.

3. The method of claim 1, further comprising:
   defining a pointer, N, to indicate an address of the virtual address space;
   advancing said pointer, N, to continually indicate the beginning of the next available virtual page;
   when virtual pages are paged out to the mass storage device, locating newly allocated blocks in the virtual page pointed to by the pointer, N.

4. The method of claim 3, further comprising:
   when reference is made to a block, copying such block into an available memory fragment if one exists which can accept such referenced block, and copying such referenced block to the page pointed to by the pointer, N, if no such available memory fragment exists.

* * * * *